United States Patent [19]

Abe

[11] Patent Number: 4,525,625
[45] Date of Patent: Jun. 25, 1985

[54] FOCUSSING CONTROL WITH ASTIGMATIC DIFFRACTING MEANS

[75] Inventor: Michiharu Abe, Yokohama, Japan
[73] Assignee: Ricoh Company, Ltd., Tokyo, Japan
[21] Appl. No.: 271,400
[22] Filed: Jun. 8, 1981
[30] Foreign Application Priority Data Jun. 7, 1980 [JP] Japan .................. 55-76945

[51] Int. Cl.³ .............................................. G01J 1/20
[52] U.S. Cl. ........................................ 250/201; 369/45
[58] Field of Search ........................... 369/44, 45, 46; 250/201, 204, 550; 354/25; 350/162.17

[56] References Cited

U.S. PATENT DOCUMENTS 3,992,574 11/1976 Bouwhuis et al. .................. 369/45
4,048,492 9/1977 Hartmann ........................... 250/201
4,195,909 4/1980 Holle et al. ...................... 350/162.17

Primary Examiner—David C. Nelms
Attorney, Agent, or Firm—Oblon, Fisher, Spivak, McClelland & Maier

[57] ABSTRACT

Disclosed in this specification is a focussing control method for a laser retrieval apparatus. An astigmatic light flux of a laser beam is produced by a diffraction grating or hologram. It is received by a light sensitive device which is divided into four equal areas. The output signals from two pairs of oppositely facing areas are compared with each other, and the optical distance between the converging lens and the reflection surface is compensated, whereby the focus of the apparatus is controlled.

6 Claims, 10 Drawing Figures

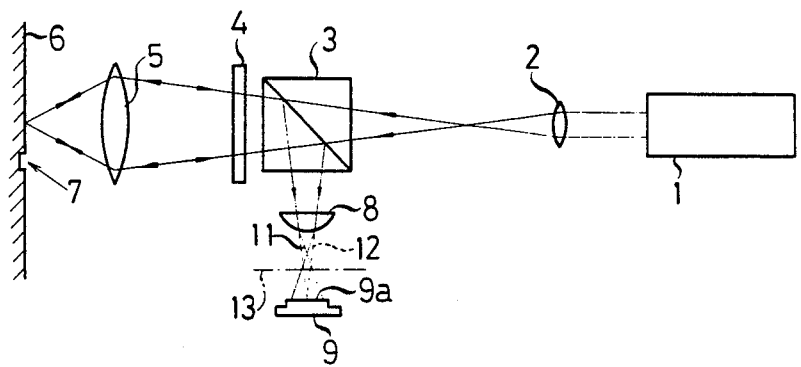
FIG. 1 PRIOR ART
FIG. 2
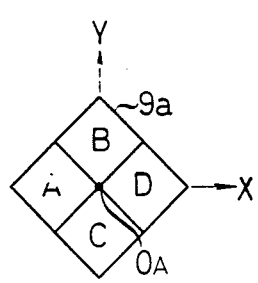
FIG. 3a
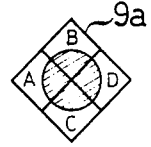
FIG. 3b
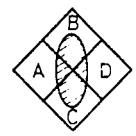
FIG. 3c
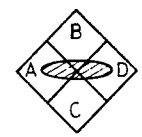
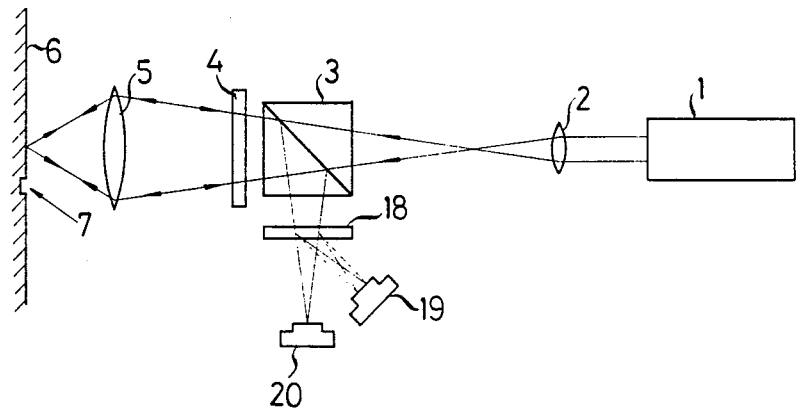
FIG. 4

FOCUSSING CONTROL WITH ASTIGMATIC DIFFRACTING MEANS

BACKGROUND OF THE INVENTION

This invention relates to a focussing control method for use in a laser optical disk, and more particularly, to a focussing control method which uses the astigmatic light flux of a diffraction grating, or a hologram in the digital data retrieval system of a laser optical disk.

Recently various kinds of apparatus using lasers have been developed, and applications of this apparatus are expanding in various fields, for example, in the optical video disk field.

In an optical video disk, the light beam recording layer of the disk recording medium is illuminated with a converged laser beam to record audio information, image information, or digital information on the recording layer whose material comprises alluminum, tellurium, or metallic thin film. Since the beam spot with which the laser beam illuminates the recording medium to record various information thereon is as small as about 1 μm, a very high density recording can be achieved.

Conversely, in converging the laser beam and illuminating the recorded layer for the retrieval of information, the narrowest part of the converged laser beam, i.e. the laser beam waist, has to be coincident with the light beam recorded layer. This means that the converged laser beam must be controlled so as to be applied to the recorded layer with a correct focal point.

In the conventional method, the focussing control of the laser beam is effected as follows:

The laser beam converged with a converging lens illuminates the recorded medium, and is reflected from the recorded medium with a beam splitter. The reflected laser beam strikes a cylindrical lens, which produces an astigmatic light flux. The astigmatic light flux is received on a light sensitive device.

The light sensitive device is divided into four equal areas with the optical axis at the center, forming two pairs of oppositely facing areas. At the position where the light sensitive device is provided, the reflected laser beam forms a round, vertically elliptical, or horizontally elliptical pattern. Thus, the size of the output signals from each pair of oppositely facing areas in the light sensitive device is compared to determine whether the laser beam converged on the recorded medium surface is in focus. When the reflected laser beam forms a round pattern, the size of the output signals from one pair of oppositely facing areas equals that of the output signals from another pair, indicating that the laser beam is converged in focus on the recorded medium. In case of a vertically elliptical or horizontally elliptical pattern being formed, the size of the output signals from each pair of oppositely facing areas differs from each other, indicating tht the laser beam converged on the recorded medium is out of focus. In such a case, the distance between the converging lens, and the recorded medium surface needs to be adjusted, by shifting the converging lens.

The output signals from the light sensitive device are compared, and the optical distance between the converging lens and the reflection surface is varied whereby the focus of the apparatus is controlled.

As described above, the conventional method uses a cylindrical lens as a means to produce an astigmatic light reflux. However, a cylindrical lens requires high manufacturing accuracy, and thus is expensive. In addition, a device using a cylindrical lens, due to its considerable thickness, is necessarily heavy.

Those problems can be solved, according to this invention, by using a diffraction grating or a hologram as a means of producing the astigmatic light flux.

BRIEF SUMMARY OF THE INVENTION

The object of the present invention is to provide a focussing control method by using a diffraction grating or a hologram as a means of producing the astigmatic light flux.

Further objects of the present invention will become more apparent and understandable from the following detailed description thereof, when read in conjunction with the accompanying drawings.

BRIEF DESCRIPTION OF THE DRAWINGS

For a better understanding of the invention, as well as other objects and features thereof, reference is made to the following description which is to be read in conjunction with the accompanying drawings wherein:

FIG. 1 is a schematic sectional view of a prior art device;

FIG. 2 is a partial schematic diagram of a light sensitive device according to the present invention;

FIG. 3a, FIG. 3b and FIG. 3c show light patterns received on the light sensitive device according to the present invention;

FIG. 4 is a schematic sectional view of focussing control method of the present invention;

DETAILED DESCRIPTION OF THE PREFERRED EMBODIMENTS

Figure 5:
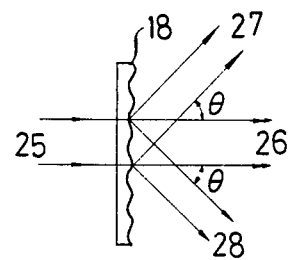
FIG. 5 shows the diffracted condition of an exit diffracted light when a collimating light strikes into a grating.

The following description is provided to enable any person skilled in the laser recording arts to make and use the invention and sets forth the best modes contemplated by the inventor in carrying out his invention. Various modifications, however, will remain readily apparent to those skilled in the art, since the generic principles of the present invention have been defined herein specifically to provide an improved focussing control method which may be utilized in the manufacture of a device in an economical manner.

FIG. 1 shows the focussing control method of the prior art. The reference numeral 1 indicates a light source, such as a gas laser or a laser diode.

The reference numeral 2 indicates a converging lens. The reference numeral 3 indicates a beam splitter. The reference numeral 4 indicates a ¼λ wave plate. The reference numeral 5 indicates an objective lens. The reference numeral 6 indicates the reflecting surface of a recording medium or a recorded medium. The reference numeral 7 indicates a concave information mark which is digital information recorded on said reflecting surface. The reference numeral 8 indicates a cylindrical lens. The reference numeral 9 indicates a light sensitive device.

A laser beam emitted from the light source 1 and converged with the converging lens 2 and the objective lens 5 illuminates the recorded medium 6, and then is reflected from said recorded medium with the beam splitter 3. The reflected laser beam strikes the cylindrical lens 8, which produces an astigmatic light flux. The astigmatic light flux is received on the light sensitive device 9. The solid line 11 indicates a beam converged by the cylindrical lens in the horizontal direction, and the broken line 12 indicates a beam converged by the cylindrical lens in the vertical direction. The chained line 13 indicates the hypothetical position of the light sensitive device, commonly called as a cross-over point, where the astigmatic light flux received thereon shows a round pattern.

FIG. 2 shows a light sensitive device according to the conventional method and the present invention, which is divided into four equal areas A, B, C, and D with the optical axis at the center $O_A$, making two pairs of oppositely facing areas. FIG. 3 represents a light pattern at crossover point in FIG 4.

When the reflected laser beam forms a round pattern, the size of the output signals from one pair of oppositely facing areas A and C equals that of the output signals from another pair B and C indicating that the laser beam is converged in focus on the recorded medium. In other words, assuming that A, B, C, and D measure the amount of light, the following equation is true:

$$(A+D)=(B+C)$$

If the surface 6 positioned at the converging point is shifted nearer to the objective lens 5, the light flux received on the light sensitive surface 9a will show a pattern as illustrated in FIG. 3b, in which case the following inequality is established;

$$(A+D)<(B+C)$$

On the other hand, if the surface 6 is shifted further from the objective lens 5, the pattern of the light flux on the light sensitive surface 9a will be shown in FIG. 3c, in which case the following inequality exists:

$$(A+D)>(B+C)$$

By comparing the output signals from the light receiving areas A and D and output signals from that of B and C with a comparator (not shown), it is possible to detect whether the laser beam is converged in focus on the surface 6.

In short, by properly adjusting the distance between the objective lens and the recorded surface, it is possible to make the converging point or focussing point coincide with the surface of the recorded medium, in which case the pattern of the light flux on the light sensitive device is shown in FIG. 3a.

In practice, it may be advisable to move the objective lens along the optical axis to adjust the distance. If the focussing point coincides with the surface of the recorded medium at all times, it can detect the digital information with high spatial resolving power. If the surface 6 is the light beam recorded medium of a video disk, the mark 7 which is dotted information can be retrieved with high spatial resolving power. In addition, any slight scrape on the recorded surface can be detected, whereby an inspection function may be achieved.

In the following, the present invention will be explained in particular with reference to the optical layout as shown in the accompanying drawings.

The reference numeral 18 indicates a diffraction grating. The reference numeral 19 and the reference numeral 20 indicate a light sensitive device whose light receiving surface is divided and an ordinary light sensitive device respectively. The light sensitive device 19 is of the same structure as the light sensitive device shown in FIG. 1.

In the case of the diffraction grating 18 being of the flat type, when a parallel light beam 25 having a wavelength of λ strikes the diffraction grating at a right angle, as shown in FIG. 5, it is diffracted into the O-order light beam 26, the first order light beam 27, and the minus first order light beam 28. At this time, the equation $\lambda/\sin\theta = P$ exists, with P representing the pitch of the grating and $\theta$ representing the diffraction angle.

Figure 6:
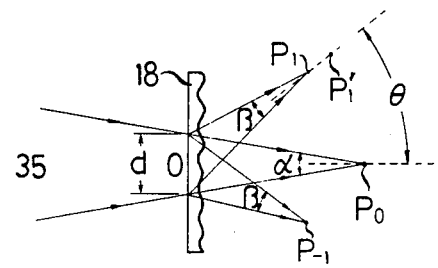
FIG. 6 shows the relation among the diffraction light, the O order light and the astigmatic light.

Referring to FIG. 6, the symbols $P_0$, $P_1$, $P_{-1}$ represent the converging points of the diffracted light beams. A symbol "$\alpha$" represents a converging angle of the incident beam. A symbol "$\beta$" represents a converging angle of the defraction beam.

When the laser beam 35 strikes the diffraction grating so as to be converged at the converging point $P_0$ with the converging angle $\alpha$, the O-order light converges at the point $P_0$, the first order light at the point $P_1$, and the minus first order light at the point $P_{-1}$, in which case the diffracted light products an astigmatic light flux.

Namely, the point $P_1$ is the converging point on a plane surface relative to FIG. 6, and if the converging angle $\alpha$ is small, the following conditions (1), (2) and (3) exist $$\beta \approx \alpha/\cos\theta \qquad (1)$$

$$\overline{OP_1} \approx d\cos\theta \qquad (2)$$

$$\overline{OP_0}\alpha = d \qquad (3)$$

In this case, the symbol d represents the diameter of the incident laser beam which strikes the diffraction grating, and the symbol $\overline{OP_1}$ represents the distance between the striking point O of the laser beam in the diffraction grating 18 and the converging point $P_1$.

From the conditions (1), (2) and (3), the following condition (4) is derived:

$$\overline{OP_1} \approx OP_0 \cos^2\theta \qquad (4)$$

The above description about the converting point $P_1$ is also applicable to the converging point $P_{-1}$. Thus, an astigmatic light flux may be produced by using a diffraction grating.

Accordingly, as shown in FIG. 4, by positioning the light sensitive device whose light receiving surface is divided into four areas adjacent to the cross-over point of the diffracted light, the focussing control causes the converging point to coincide with the surface of the recorded medium 6 as in the conventional method shown in FIG. 1. It is also possible to use not only the first order light beam but also the minus first order light beam.

The diffraction grating 18 is of the flat type, and can be made thin and light.

In addition, it can be mass produced at a low cast by the replica method, for example.

A diffraction grating having optional diffraction efficiency is available. If a diffraction grating of a higher diffraction efficiency, i.e. one having a higher ratio of the diffracted first order light beam to the non-diffracted O-order light beam, is used, it is possible to detect the total light amount as shown in FIG. 3a with the diffracted first order light beam. On the other hand, it is also possible to provide another light sensitive device 20 adjacent to the converging point of the non-diffracted O-order light beam by using a diffraction grating of a smaller diffraction efficiency, in which case the amount of reflected light from the surface 6 may be detected with the light sensitive device 20.

The light sensitive device 20 may be a high respondent diode element with a small light receiving surface. Thus, it can be used as a high respondent retrieval system in a video disk, for example.

As described, a feature of the present invention resides in the utilization of the astigmatic light flux resulting from the diffractive function of a diffraction grating to cause the converging point to coincide with the plane reflecting surface, and so, in addition to a diffraction grating with parallel striped gratings, it is also possible to use a hologram for such a member.

As is apparent from the formula $OP_1 \approx OP_0 \cos^2 \theta$, a greater diffraction angle $\theta$ results in a greater volume of astigmatic light flux, and so it is more advantageous in detecting the light quantity.

Figure 7:
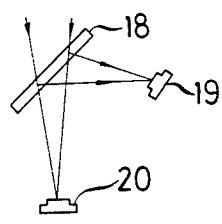
FIG. 7 is a schematic diagram of an embodiment to get a larger diffraction angle.

If, as shown in FIG. 4, the laser beam strikes into the diffraction grating, it may be impossible to provide a large diffraction angle Q in respect of the optical layout. In such a case, a large diffraction angle may be provided by placing the diffraction grating in a slanting position, as shown in FIG. 7.

Figure 8:
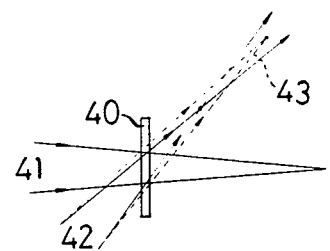
FIG. 8 is a schematic diagram of an embodiment of a grating which consists of a hologram.

FIG. 8 shows an embodiment of the diffraction grating which is made of a hologram. The reference light beam 41 and the object light beam 42 are caused to strike the holographic recording medium to make a hologram. When a reproducing light beam, i.e. incident beam to the diffraction grating 18 as shown in FIG. 4, strikes into the hologram in the same direction as the reference light beam 41, the original object light beam 42 is reproduced. Using a converging light beam with large astigmatic light flux, it is possible to increase the amount of the astigmatic light flux of the converging light reproduced from the hologram. The broken line 43 shows the shape of the objective light beam 42 with a right angle against FIG. 8.

As described in the foregoing, the present invention uses a diffraction grating as a means of producing an astigmatic light flux. Since such a diffraction grating is light weight and can be easily and inexpensively manufactured, the present invention contributes to provide a compact and inexpensive laser beam optical apparatus.

While the invention has been described with reference to its preferred embodiments, it will be understood by those skilled in the art, that various changes may be made and equivalents may be substituted for method and elements thereof without departing from the true spirit and scope of the invention. In addition, many modifications may be made to adapt a particular situation or material to the teachings of the invention without departing from its essential teachings.

What is claimed is:

1. A focusing control method for an optical device, comprising the steps of:
   (a) converging a light beam from a light source;
   (b) illuminating a reflective surface with said light beam to produce a reflected beam;
   (c) producing an astigmatic light flux of said reflective beam by a diffraction means;
   (d) detecting the magnitude of said light flux by means of a four sided light sensitive device; and
   (e) focussing said optical device in response to said detection.

2. An apparatus for controlling the focussing of an optical device, comprising:
   a light source producing a light beam;
   means for converging said light beam onto a reflective surface and producing a reflected beam thereby;
   diffraction means for receiving said reflected beam and producing an astigmatic light flux;
   means for detecting the magnitude of said astigmatic light flux;
   means for focussing said optical device in response to said means for detecting.

3. A focussing control method for laser retrieval apparatus comprising the steps of:
   (a) converging a laser beam from a laser light source with a converging lens;
   (b) illuminating a recorded medium by said converged laser beam
   (c) reflecting said laser beam reflected on said recorded medium by a beam splitter which is arranged in an optical path of said laser beam and adapted to transmit said laser beam from said laser light source toward said recording medium;
   (d) shifting of phase of said laser beam by a $\frac{1}{4}\lambda$ wave plate which is arranged in the optical path between said converging lens and the beam splitter;
   (e) producing an astigmatic light flux of the laser beam reflected by said beam splitter by a diffraction means;
   (f) positioning an equally divided four sided light sensitive device in the optical path adjacent to a crossover point of said laser beam passed through said diffraction means;
   (g) detecting said astigmatic light flux by said four sided light sensitive device;
   (h) outputing a signal from each of the oppositely facing areas of said detecting device; and
   (i) adjusting the distance between said converging lenses and the recorded medium by means of the output signals obtained by said detection until the magnitude of the signal from each pair of oppositely facing areas is equal.

4. A focussing control method as in claim 3 wherein:
   said step of producing an astigmatic light flux of a laser beam reflected by said beam splitter includes the step of utilizing a diffraction grating.

5. A focussing control method as in claim 3 wherein:
   said step of producing an astigmatic light flux of a laser beam reflected by said beam splitter includes the step of utilizing a hologram.

6. A focusing control method as in claim 3 further comprising the step of:
   positioning an additional light sensitive device for receiving non-diffraction light flux of a laser beam behind said diffraction means.

* * * * *